(12) United States Patent
Elkayam

(10) Patent No.: US 10,279,400 B2
(45) Date of Patent: May 7, 2019

(54) INDEXABLE, SINGLE-SIDED CUTTING INSERT HAVING TWO CLAMPING BORES AND CUTTING TOOL THEREFOR

(71) Applicant: Iscar, Ltd., Tefen (IL)

(72) Inventor: Sagi Elkayam, Haifa (IL)

(73) Assignee: Iscar, Ltd., Tefen (IL)

( * ) Notice: Subject to any disclaimer, the term of this patent is extended or adjusted under 35 U.S.C. 154(b) by 50 days.

(21) Appl. No.: 15/418,849

(22) Filed: Jan. 30, 2017

(65) Prior Publication Data

US 2018/0214961 A1    Aug. 2, 2018

(51) Int. Cl.
*B23C 5/20* (2006.01)
*B23C 5/22* (2006.01)

(52) U.S. Cl.
CPC ............ *B23C 5/207* (2013.01); *B23C 5/2221* (2013.01); *B23C 2200/165* (2013.01); *B23C 2200/361* (2013.01); *B23C 2200/362* (2013.01); *B23C 2210/168* (2013.01)

(58) Field of Classification Search
CPC ....... B23C 5/20; B23C 5/2221; B23C 5/2247; B23C 5/2234; B23C 5/207; B23C 5/2273; B23C 5/202; B23C 2200/165; B23C 2200/161; B23C 2200/16
See application file for complete search history.

(56) References Cited

U.S. PATENT DOCUMENTS

| 4,919,573 A | * | 4/1990 | Tsujimura | ............. | B23C 5/2221 |
| | | | | | 407/103 |
| 4,940,369 A | | 7/1990 | Aebi et al. | | |
| 5,542,795 A | | 8/1996 | Mitchell | | |

(Continued)

FOREIGN PATENT DOCUMENTS

| DE | 2231550 A1 | 1/1974 |
| DE | 9207277 U1 | 8/1992 |

(Continued)

OTHER PUBLICATIONS

International Search Report dated Apr. 17, 2018, issued in PCT counterpart application (No. PCT/IL2018/050021).

(Continued)

*Primary Examiner* — Nicole N Ramos
(74) *Attorney, Agent, or Firm* — Womble Bond Dickinson (US) LLP

(57) ABSTRACT

A cutting tool rotatable about a tool axis, having a cutting body and at least one indexable, single-sided cutting insert removably secured in an insert receiving pocket of the cutting body. The cutting insert has opposing upper and lower surfaces with a peripheral side surface extending therebetween and a central axis passing therethrough. First and second clamping bores extend between and open out at the upper and lower surfaces. First and second primary cutting edges are formed at the intersection of the upper surface and the peripheral side surface. The lower surface includes first and second annular recesses communicating with the first and second clamping bores, respectively, and first and second recess channels extending from the first and second clamping bores, respectively, to the peripheral side surface. The first and second recess channels extend parallel to a longitudinal first plane containing the central axis.

24 Claims, 7 Drawing Sheets

(56) References Cited

U.S. PATENT DOCUMENTS

| | | | |
|---|---|---|---|
| 5,893,683 A | 4/1999 | Johnson | |
| 6,048,140 A | 4/2000 | Johnson | |
| 6,413,021 B1* | 7/2002 | Koch | B23D 77/025 |
| | | | 407/43 |
| 7,597,507 B2 | 10/2009 | Sakamoto et al. | |
| 9,682,433 B2* | 6/2017 | Choi | B23C 5/06 |
| 2003/0017014 A1 | 1/2003 | Morgulis et al. | |
| 2004/0131431 A1* | 7/2004 | Satran | B23C 5/109 |
| | | | 407/40 |
| 2005/0152753 A1* | 7/2005 | DeRoche | B23C 5/109 |
| | | | 407/48 |
| 2007/0177951 A1* | 8/2007 | Sakamoto | B23C 5/109 |
| | | | 407/40 |
| 2008/0044239 A1 | 2/2008 | Sjoo et al. | |
| 2008/0110526 A1 | 5/2008 | Cong et al. | |
| 2010/0150670 A1* | 6/2010 | Hecht | B23C 5/109 |
| | | | 407/40 |
| 2011/0305533 A1* | 12/2011 | Kisselbach | B23C 5/04 |
| | | | 407/48 |
| 2012/0257935 A1* | 10/2012 | Sture | B23F 21/166 |
| | | | 407/51 |
| 2016/0067805 A1* | 3/2016 | Nickel | B23C 5/207 |
| | | | 407/25 |

FOREIGN PATENT DOCUMENTS

| | | |
|---|---|---|
| FR | 2837732 | 10/2003 |
| FR | 2837732 A1 | 10/2003 |
| RU | 2572110 C1 | 12/2015 |

OTHER PUBLICATIONS

Written Opinion dated Apr. 17, 2018, issued in PCT counterpart application (No. PCT/IL2018/050021).

* cited by examiner

INDEXABLE, SINGLE-SIDED CUTTING INSERT HAVING TWO CLAMPING BORES AND CUTTING TOOL THEREFOR

FIELD OF THE INVENTION

The present invention relates to an indexable cutting insert having two clamping bores and a cutting tool therefor, for use in metal cutting processes in general, and for high speed milling operations in particular.

BACKGROUND OF THE INVENTION

Within the field of cutting tools used in high speed milling, there are many examples of indexable cutting inserts having two clamping bores, removably retained in an insert receiving pocket of a cutting body.

FR 2837732 discloses a milling tool having a cylindrical shaped cutting body with two flutes extending rearwardly from a front surface thereof, each flute having an insert receiving pocket with an indexable cutting insert retained therein. Each cutting insert has opposing upper and lower surfaces, with two clamping bores extending therethrough, and a longitudinally extending channel formed in the lower surface. Two clamping screws extend through the two clamping bores, and each clamping screw engages a threaded bore in a seat surface of the insert receiving pocket. A radially inner side wall of the channel is clamped against a corresponding side surface of a shoulder formed on the seat surface.

U.S. Pat. No. 7,597,507 discloses a milling tool having a cylindrical shaped cutting body with two flutes extending rearwardly from a front surface thereof, each flute having an insert receiving pocket with an indexable cutting insert retained therein. Each cutting insert has opposing upper and lower surfaces, with two clamping bores extending therethrough, and circular recessed portions formed at the openings of the clamping bores on the lower surface. Two clamping screws extend through the two clamping bores, and each clamping screw engages a threaded bore in a seat surface of the insert receiving pocket. Circular engagement protrusions are formed at the openings of the threaded bores on the seat surface, and the circular recessed portions engage the circular engagement protrusions.

SUMMARY OF THE INVENTION

In accordance with the present invention, there is provided an indexable, single-sided cutting insert having opposing upper and lower surfaces with a peripheral side surface extending therebetween and a central axis passing therethrough, the upper and lower surfaces having shapes that differ from one another;

first and second clamping bores extending between and intersecting the upper and lower surfaces, the first and second clamping bores having first and second bore axes, respectively; and first and second primary cutting edges formed at the intersection of the upper surface and the peripheral side surface;

wherein the lower surface includes:
a planar base surface,
first and second annular recesses communicating with the first and second clamping bores, respectively, and
first and second recess channels extending from the first and second clamping bores, respectively, to the peripheral side surface, the first and second recess channels extending parallel to a longitudinal first plane containing the central axis.

Also in accordance with the present invention, there is provided a cutting tool rotatable about a tool axis, having:
a cutting body; and
at least one indexable cutting insert of the sort described above removably secured in an insert receiving pocket of the cutting body.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
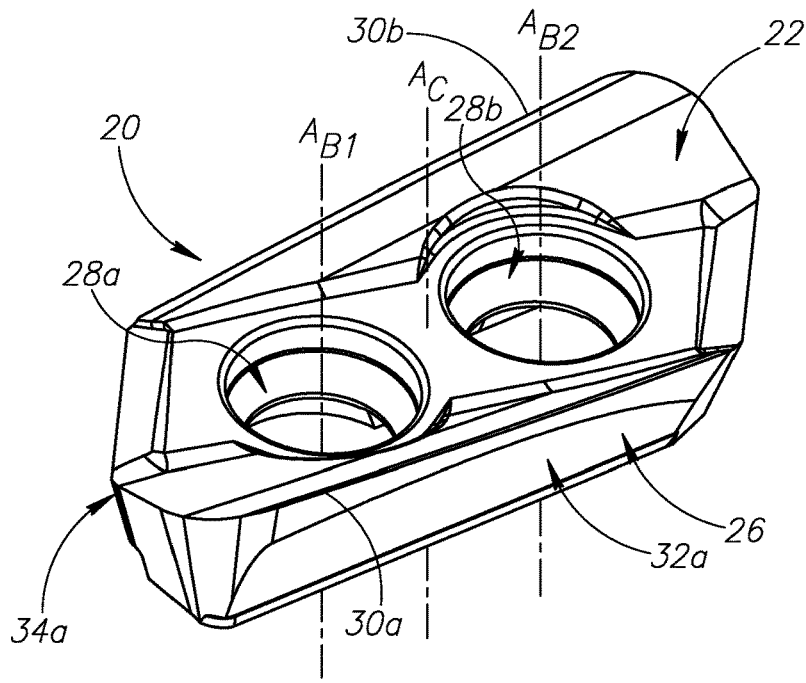
FIG. 1 is a first perspective view of a cutting insert in accordance with some embodiments of the present invention.

The present invention relates to an indexable cutting insert 20, as shown in FIGS. 1 to 4, having opposing upper and lower end surfaces 22, 24 with a peripheral surface 26 extending therebetween and a central axis $A_C$ extending therethrough.

In some embodiments of the present invention, the cutting insert 20 may be indexed about the central axis $A_C$.

Also in some embodiments of the present invention, the cutting insert 20 may preferably be manufactured by form pressing and sintering a cemented carbide, such as tungsten carbide, and may be coated or uncoated.

Further in some embodiments of the present invention, the lower surface 24 may exhibit rotational symmetry about the central axis $A_C$.

According to the present invention, as shown in FIGS. 1 to 4, first and second clamping bores 28a, 28b extend between and open out at the upper and lower surfaces 22, 24.

Also according to the present invention, first and second primary cutting edges 30a, 30b are formed at the intersection of the upper surface 22 and the peripheral side surface 26.

In some embodiments of the present invention, the first and second primary cutting edges 30a, 30b may be spaced apart.

Also in some embodiments of the present invention, the peripheral side surface 26 may have first and second opposing primary side surfaces 32a, 32b and first and second opposing secondary side surfaces 34a, 34b. The primary side surfaces 32a, 32b may be longer than the second side surfaces 34a, 34b.

Further in some embodiments of the present invention, the first and second opposing primary side surfaces 32a, 32b may intersect the upper surface 22 to form the first and second primary cutting edges 30a, 30b, respectively.

The upper and lower surfaces 22, 24 have shapes which differ from one another, with the lower surface 24 comprising the only seating surface. By virtue of no cutting edges being formed at the intersection of the lower surface 24 and the peripheral side surface 26, the cutting insert 20 may be termed as 'single-sided' or 'non-reversible'.

According to the present invention, as shown in FIGS. 1 to 4, the lower surface 24 includes a planar base surface 35.

In some embodiments of the present invention, the base surface 35 may be ground.

Also in some embodiments of the present invention, the base surface 35 may be perpendicular to the central axis $A_C$.

Further in some embodiments of the present invention, the base surface 35 may include no more than two laterally spaced apart coplanar base sub-surfaces 35', 35".

Figure 2:
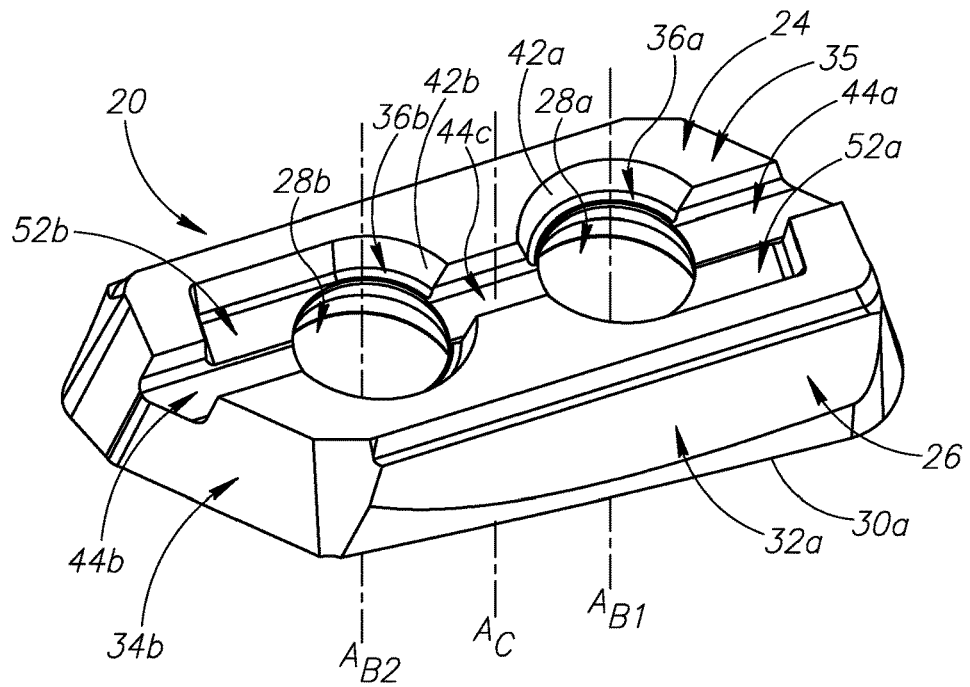
FIG. 2 is a second perspective view of the cutting insert shown in FIG. 1.
Figure 3:
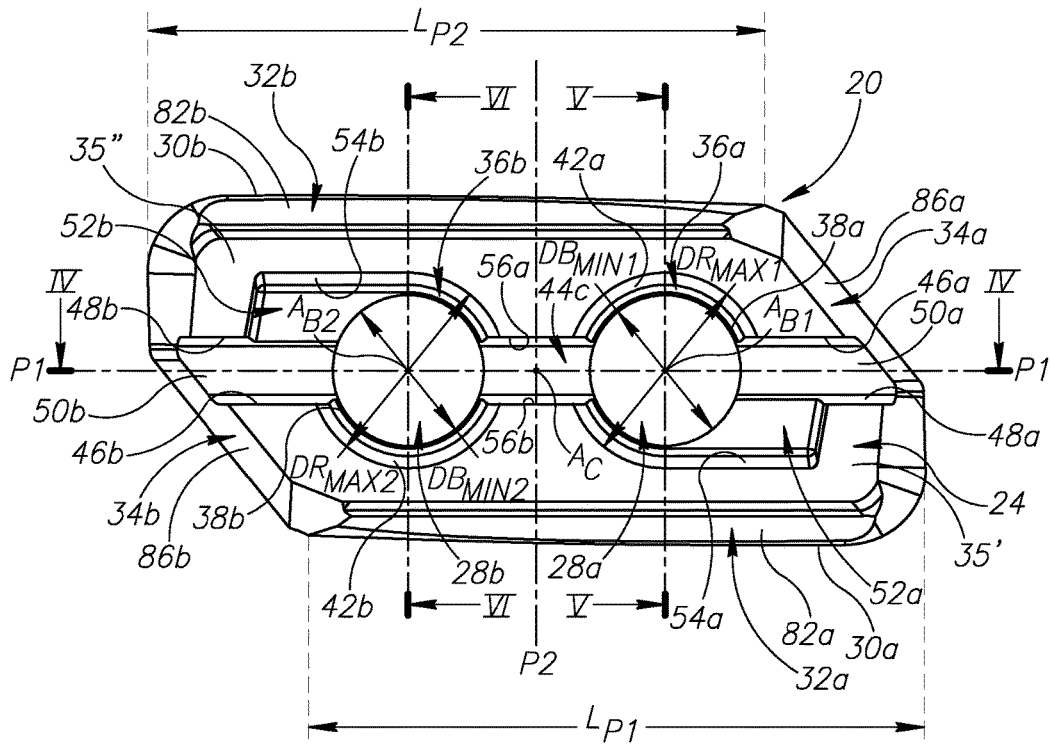
FIG. 3 is a bottom view of the cutting insert shown in FIGS. 1 and 2.

As shown in FIGS. 2 and 3, the lower surface 24 may have first and second annular recesses 36a, 36b communicating with the first and second clamping bores 28a, 28b, respectively. The clamping bores 28a, 28b have respective first and second bore axes $A_B1$, $A_B2$.

It should be appreciated that use of the term "annular", throughout the description and claims, with respect to the first and second annular recesses 36a, 36b, accounts for the first and second clamping bores 28a, 28b respectively communicating therewith, being circular in cross-section, and does not necessarily limit the outer peripheral shape of the first and second annular recesses 36a, 36b.

It should also be appreciated that the provision of the first and second annular recesses 36a, 36b contributes in reducing the overall weight of the cutting insert 20, which is very important in high speed milling operations, in which the cutting insert 20 is subjected to high centrifugal forces.

In some embodiments of the present invention, the first and second annular recesses 36a, 36b may be coaxial with the first and second clamping bores 28a, 28b, respectively.

As shown in FIGS. 3 to 6, the first and second annular recesses 36a, 36b may intersect first and second bore neck-portions 40a, 40b of the first and second clamping bores 28a, 28b at first and second minimum bore diameters $DB_{MIN}1$, $DB_{MIN}2$, respectively.

In some embodiments of the present invention, the first and second annular recesses 36a, 36b may include first and second annular shoulder surfaces 38a, 38b, respectively, and the first and second annular shoulder surfaces 38a, 38b may intersect the first and second bore neck-portions 40a, 40b, respectively.

Also in some embodiments of the present invention, the first and second annular shoulder surfaces 38a, 38b may be coplanar and perpendicular to the central axis $A_C$.

Further in some embodiments of the present invention, as shown in FIGS. 3 to 6, the first and second annular recesses 36a, 36b may include first and second conical recess surfaces 42a, 42b, respectively, and the first and second conical recess surfaces 42a, 42b may intersect the base surface 35 at first and second maximum recess diameters $DR_{MAX}1$, $DR_{MAX}2$, respectively.

Yet further in some embodiments of the present invention, the first maximum recess diameter $DR_{MAX}1$ may be at least six-fifths of the first minimum bore diameter $DB_{MIN}1$, and the second maximum recess diameter $DR_{MAX}2$ may be at least six-fifths of the second minimum bore diameter $DB_{MIN}2$.

According to the present invention, as shown in FIGS. 2 and 3, first and second recess channels 44a, 44b extend from the first and second clamping bores 28a, 28b, respectively, to the peripheral side surface 26.

In some embodiments of the present invention, the first and second recess channels 44a, 44b may include first and second abutment walls 46a, 46b, respectively, transverse to the base surface 35.

Also in some embodiments of the present invention, the first and second abutment walls 46a, 46b may be ground and planar.

It should be appreciated that the provision of the first and second annular recesses 36a, 36b communicating with the first and second clamping bores 28a, 28b advantageously enables the cutting insert 20 to be mounted in a single grinding jig (not shown) for unobstructed grinding of the base surface 35 and the first and second abutment walls 46a, 46b, thus improving manufacturing efficiency.

It should be appreciated that for embodiments of the present invention in which the first and second maximum recess diameters $DR_{MAX}1$, $DR_{MAX}2$ are at least six-fifths of the first and second minimum bore diameters $DB_{MIN}1$, $DB_{MIN}2$, respectively, the overall weight of the cutting insert 20 is advantageously reduced.

In some embodiments of the present invention, the first and second abutment walls 46a, 46b may be perpendicular to the base surface 35.

Also in some embodiments of the present invention, the first and second recess channels 44a, 44b may include first and second non-abutment abutment walls 48a, 48b facing towards the first and second abutment walls 46a, 46b, respectively.

Further in some embodiments of the present invention, the first abutment and first non-abutment walls 46a, 48a may be spaced apart by a first planar channel floor surface 50a, the second abutment and second non-abutment walls 46b, 48b may be spaced apart by a second planar channel floor surface 50b, and the first and second channel floor surfaces 50a, 50b may be coplanar and parallel to the base surface 35.

Figure 5:
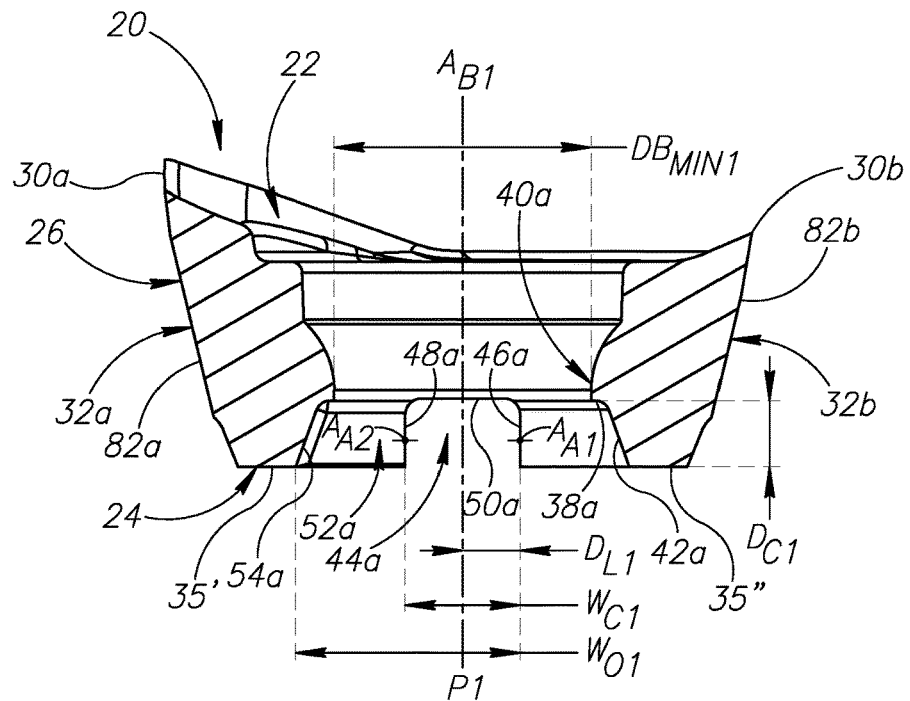
FIG. 5 is a cross-sectional view of the cutting insert shown in FIG. 3, taken along the line V-V.
Figure 6:
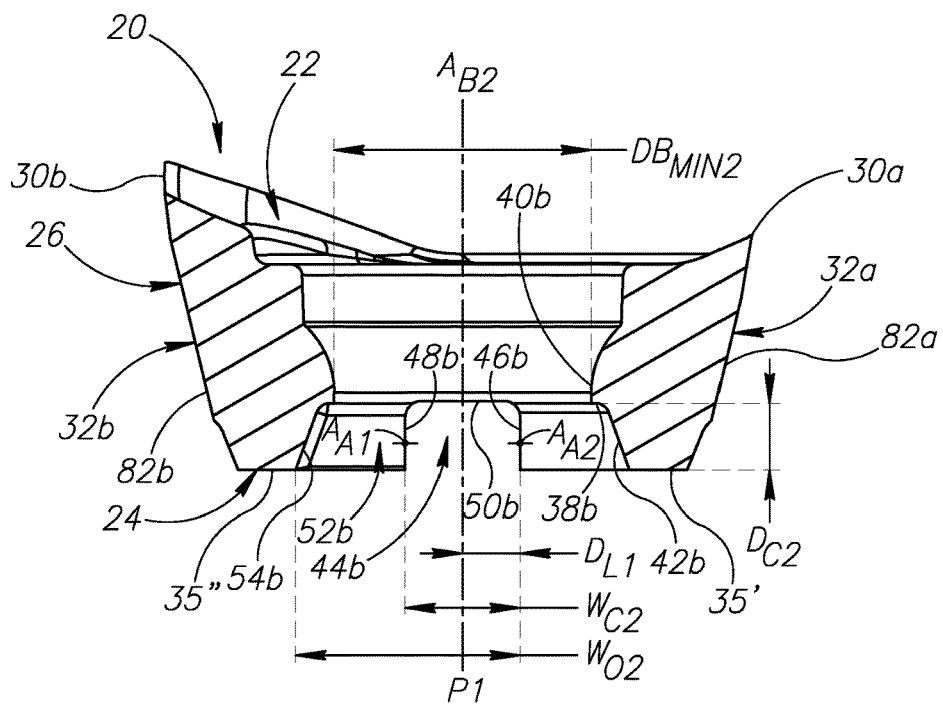
FIG. 6 is a cross-sectional view of the cutting insert shown in FIG. 3, taken along the line VI-VI.

As shown in FIGS. 5 and 6, the first and second recess channels 44a, 44b may have first and second channel depths $D_C1$, $D_C2$, respectively, measured parallel to the central axis $A_C$, and the first channel depth $D_C1$ may be at least one-fifth of the first minimum bore diameter $DB_{MIN}1$, and the second channel depth $D_C2$ may be at least one-fifth of the second minimum bore diameter $DB_{MIN}2$.

According to the present invention, as shown in FIG. 3, the first and second recess channels 44a, 44b extend parallel to a longitudinal first plane P1 containing the central axis $A_C$.

In some embodiments of the present invention, the first and second abutment walls 46a, 46b may be located on opposite sides of the longitudinal first plane P1.

Also in some embodiments of the present invention, as shown in FIGS. 5 and 6, the first and second abutment walls 46a, 46b may each be spaced apart from the longitudinal plane P1 by a first lateral distance $D_L1$.

Further in some embodiments of the present invention, as shown in FIG. 3, the first and second abutment walls 46a, 46b may be spaced apart from one another along the longitudinal first plane P1, and located on opposite sides of a lateral second plane P2 containing the central axis $A_C$ and perpendicular to the longitudinal first plane P1.

Yet further in some embodiments of the present invention, the first and second opposing secondary side surfaces 34a, 34b may intersect the longitudinal first plane P1.

Figure 4:
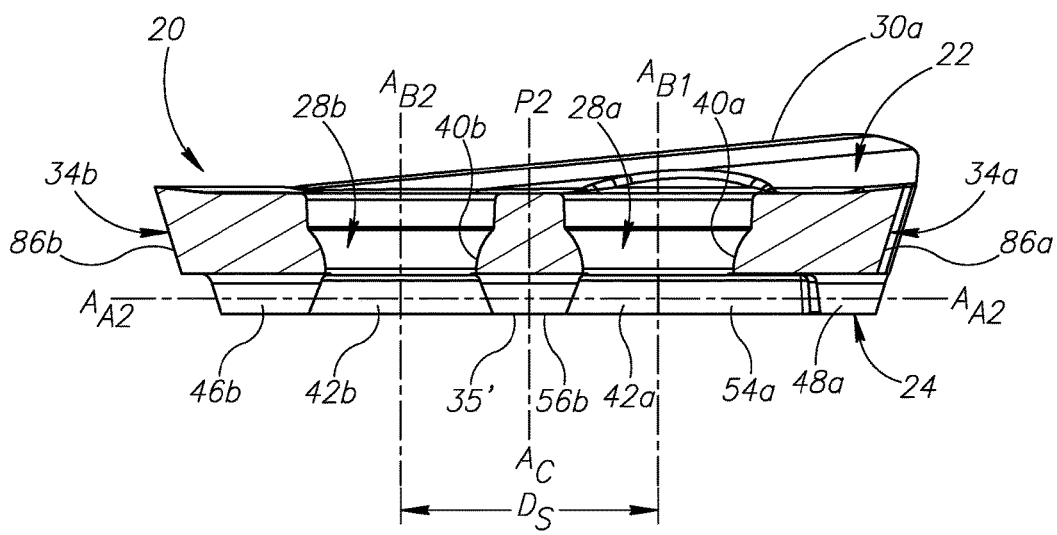
FIG. 4 is a cross-sectional view of the cutting insert shown in FIG. 3, taken along the line IV-IV.

As shown in FIGS. 4 to 6, a portion of a first abutment axis $A_A1$ parallel to the longitudinal first plane P1 may be contained in the first abutment wall 46a, and a portion of a second abutment axis $A_A2$ parallel to the longitudinal first plane P1 may be contained in the second abutment wall 46b.

In some embodiments of the present invention, the first and second abutment walls 46a, 46b may be parallel to the longitudinal first plane P1.

As shown in FIGS. 5 and 6, the first and second recess channels 44a, 44b may have first and second channel widths $W_C1$, $W_C2$, respectively.

In some embodiments of the present invention, the first channel width $W_C1$ may be measured laterally from the first abutment wall 46a to the first non-abutment wall 48a, and the second channel width $W_C2$ may be measured laterally from the second abutment wall 46b to the second non-abutment wall 48b.

Also in some embodiments of the present invention, the first and second channel widths $W_C1$, $W_C2$ may be equal to twice the first lateral distance $D_L1$.

As shown in FIGS. 4 to 6, a portion of the first abutment axis $A_A1$ may be contained in the second non-abutment wall 48b, and a portion of the second abutment axis $A_A2$ may be contained in the first non-abutment wall 48a.

It should be appreciated that for embodiments of the present invention in which the second non-abutment wall 48b contains a portion of the first abutment axis $A_A1$ and the first non-abutment wall 38a contains a portion of the second abutment axis $A_A2$, the first and second recess channels 44a, 44b may be produced in a single grinding step.

As shown in FIGS. 3 to 6, the first and second bore axes $A_B1$, $A_B2$ may be contained in the longitudinal first plane P1.

In some embodiments of the present invention, the first and second bore axes $A_B1$, $A_B2$ may be parallel and spaced apart by a bore distance $D_S$, Also in some embodiments of the present invention, the first and second primary cutting edges 30a, 30b may have first and second primary lengths $L_P1$, $L_P2$, respectively, measured parallel to the longitudinal first plane P1, and each of the first and second primary lengths $L_P1$, $L_P2$ may be greater than twice the bore distance $D_S$.

Further in some embodiments of the present invention, the longitudinal first plane P1 may not intersect the first and second primary cutting edges 30a, 30b.

As shown in FIGS. 2 and 3, the first recess channel 44a forms part of a first cavity 52a in the lower surface 24, and the second recess channel 44b forms part of a second cavity 52b in the lower surface 24. The two cavities 52a, 52b are longitudinally spaced apart from one another and located on opposite sides of the lateral second plane P2. Also, each cavity 52a, 52b is asymmetric about the longitudinal first plane P1. Neither cavity 52a, 52b opens to either primary side surface 32a, 32b.

It should be appreciated that the provision of the first and second cavities 52a, 52b contributes in reducing the overall weight of the cutting insert 20, which, as already mentioned, is very important in high speed milling operations, in which the cutting insert 20 is subjected to high centrifugal forces.

In some embodiments of the present invention, the first cavity 52a may have a first cavity wall 54a facing towards the first abutment wall 46a, and the second cavity 52b may have a second cavity wall 54b facing towards the second abutment wall 46b.

Also in some embodiments of the present invention, the first cavity 52a may adjoin the first annular recess 36a, and the second cavity 52b may adjoin the second annular recess 36b. As shown in FIGS. 3 and 5, the first cavity 52a may have a first cavity width $W_O1$ measured laterally from the first abutment wall 46a to the first cavity wall 54a.

As shown in FIGS. 3 and 6, the second cavity 52b may have a second cavity width $W_O2$ measured laterally from the second abutment wall 46b to the second cavity wall 54b.

In some embodiments of the present invention, the first cavity width $W_O1$ may be greater than the first channel width $W_C1$, and the second cavity width $W_O2$ may be greater than the second channel width $W_C2$.

Also in some embodiments of the present invention, the first cavity width $W_O1$ may be more than 50% greater than the first channel width $W_C1$, and the second cavity width $W_O2$ may be more than 50% greater than the second channel width $W_C2$.

As shown in FIGS. 2 and 3, the lower surface 24 may include a third recess channel 44c extending from the first clamping bore 28a to the second clamping bore 28b.

It should be appreciated that the provision of the third recess channel 44c contributes in reducing the overall weight of the cutting insert 20, which, as already mentioned, is very important in high speed milling operations, in which the cutting insert 20 is subjected to high centrifugal forces.

It should also be appreciated that for embodiments of the present invention which include the third recess channel 44c, the base surface 35 has two laterally spaced apart coplanar base sub-surfaces 35', 35".

In some embodiments of the present invention, the third recess channel 44c may include facing third and fourth non-abutment walls 56a, 56b.

Also in some embodiments of the present invention, a portion of the first abutment axis $A_A1$ may be contained in the third non-abutment wall 56a, and a portion of the second abutment axis $A_A2$ may be contained in the fourth non-abutment wall 56b.

It should be appreciated that for embodiments of the present invention in which the third non-abutment wall 56a contains a portion of the first abutment axis $A_A1$ and the fourth non-abutment wall 56b contains a portion of the second abutment axis $A_A2$, the third recess channel 44c may be produced in the same single grinding step that the first and second recess channels 44a, 44b are produced.

As shown in FIGS. 7 to 10, the present invention also relates to a cutting tool 58 rotatable about a tool axis $A_T$, having a cutting body 60 and at least one indexable cutting insert 20 removably secured in an insert receiving pocket 62 of the cutting body 60.

In some embodiments of the present invention, the cutting body 60 may be cylindrical shaped, having a circumferential wall 64 extending between forward and rear end surfaces 66, 68 facing in opposing forward and rearward directions $F_D$, R$_D$, respectively, and the insert receiving pocket 62 may be formed in the circumferential wall 64 adjacent the forward end surface 66.

Also in some embodiments of the present invention, the insert receiving pocket 62 may have a planar seat surface 70, a first support surface 72 transverse to the seat surface 70, first and second threaded bores 74a, 74b in the seat surface 70, and a knob 76 protruding from the seat surface 70.

Further in some embodiments of the present invention, the first support surface 72 may face radially outwardly.

Yet further in some embodiments of the present invention, the first support surface 72 may intersect the forward end surface 66.

Still further in some embodiments of the present invention, the first support surface 72 may be elongated and extend along a support axis A$_S$.

Figure 8:
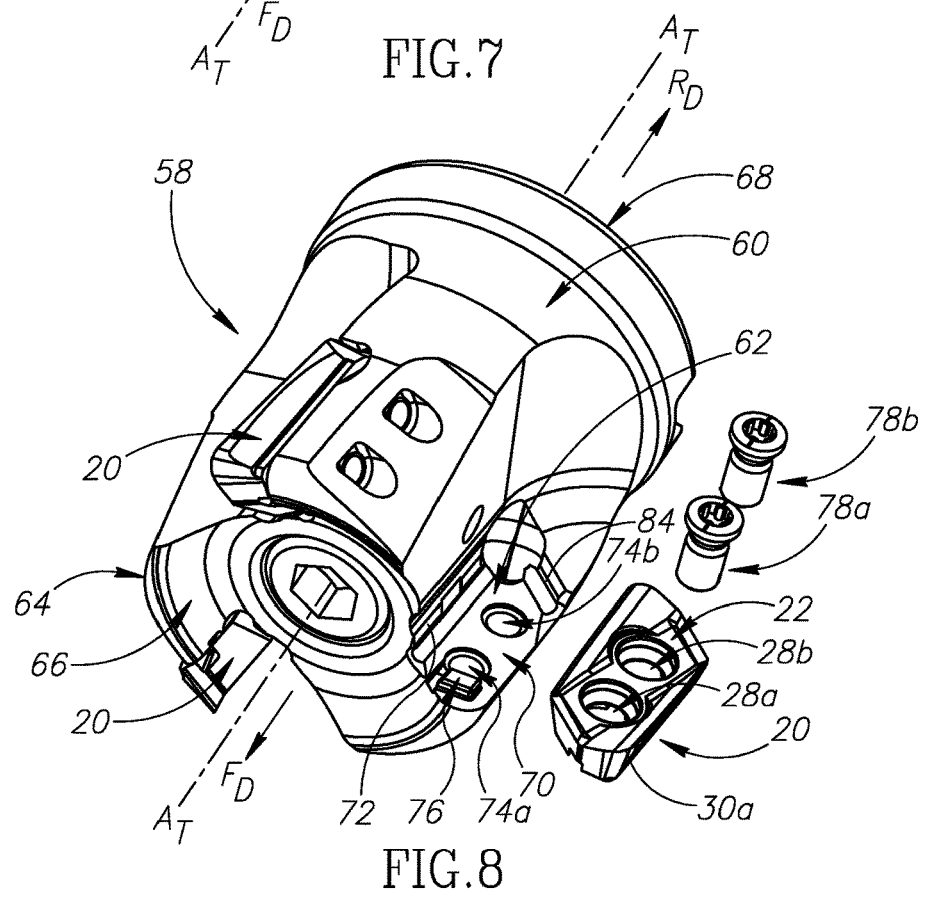
FIG. 8 is an exploded perspective view of the cutting tool shown in FIG. 7.
Figure 10:
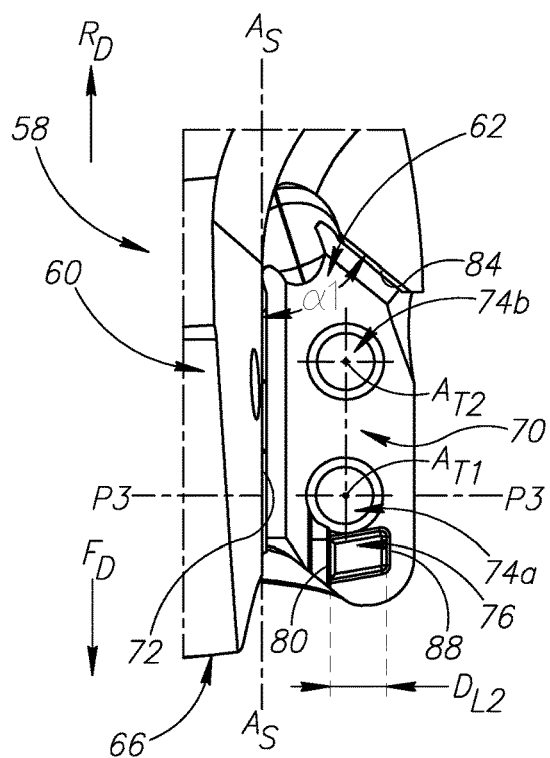
FIG. 10 is a front view of the insert pocket of the cutting tool shown in FIG. 7, with its cutting insert removed.

As shown in FIGS. 8 and 10, the first threaded bore 74a may be located between the second threaded bore 74b and the knob 76.

In some embodiments of the present invention, first and second threaded bores 74a, 74b may have first and second thread axes A$_{T1}$, A$_{T2}$, respectively.

As shown in FIGS. 8 and 10, the first threaded bore 74a may be located forward of the second threaded bore 74b.

In some embodiments of the present invention, the base surface 35 may be in contact with the seat surface 70, and first and second clamping screws 78a, 78b may extend through the first and second clamping bores 28a, 28b and threadingly engage the first and second threaded bores 74a, 74b.

Figure 7:
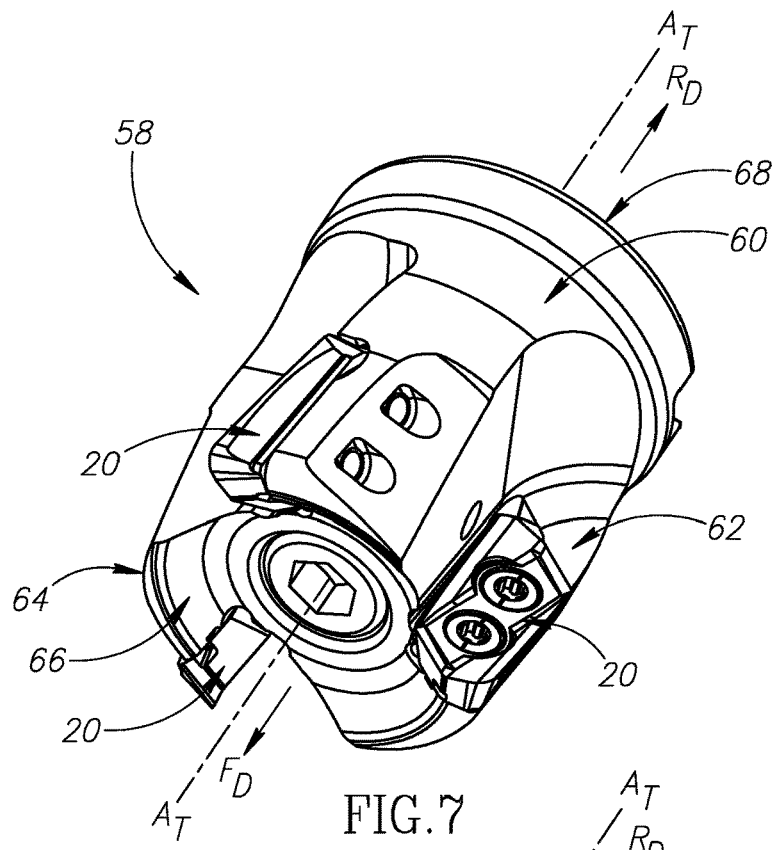
FIG. 7 is a perspective view of a cutting tool in accordance with some embodiments of the present invention.
Figure 9:
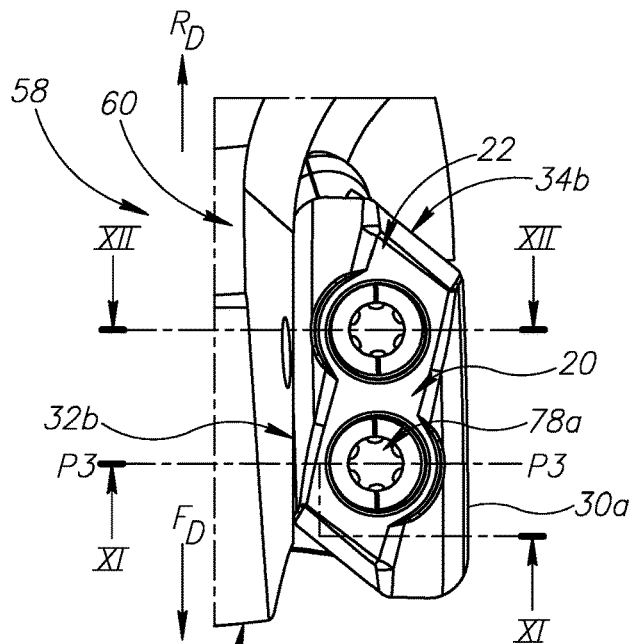
FIG. 9 is a front view of an insert pocket of the cutting tool shown in FIG. 7, with its cutting insert secured.

In a first index position of the cutting insert 20 in the insert receiving pocket 62, as shown in FIGS. 7 to 9, the first and second threaded bores 74a, 74b may be eccentric in relation to the first and second clamping bores 28a, 28b, respectively.

It should be appreciated that the eccentric relationship of the first and second threaded bores 74a, 74b in relation to the first and second clamping bores 28a, 28b, promotes translational movement of the cutting insert 20 towards the first support surface 72 on tightening of the first and second clamping screws 78a, 78b.

Further in some embodiments of the present invention, the knob 76 may be situated in one of the first and second recess channels 44a, 44b, having a stopper surface 80 facing radially inwardly.

Yet further in some embodiments of the present invention, the stopper surface 80 may be planar and perpendicular to the seat surface 70.

Figure 11A:
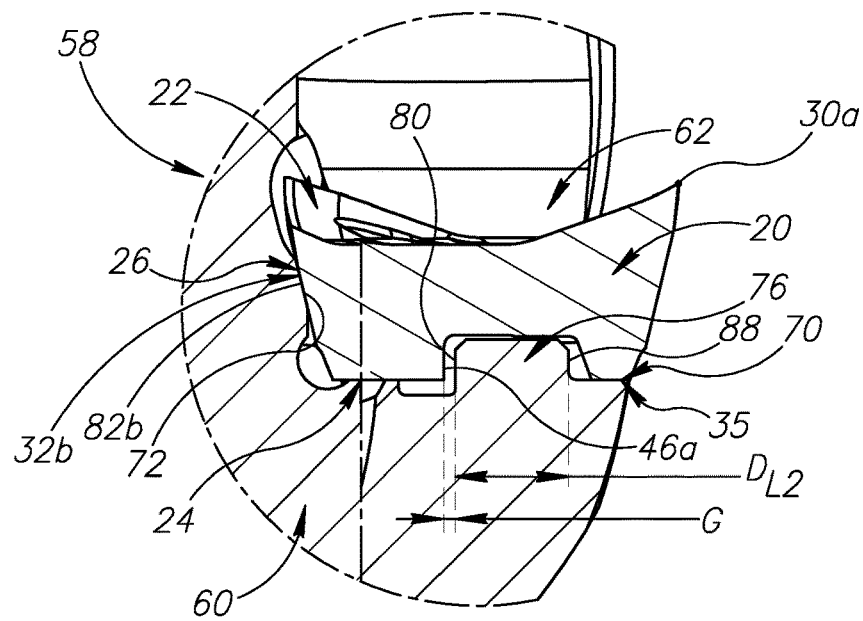
FIG. 11a is a cross-sectional view of the cutting tool shown in FIG. 9, taken along the line XI-XI, in the absence of a radially outward force on the cutting insert.

In the absence of a radially outward force F$_R$ on the cutting insert 20, in a cross-section taken in a third plane P3 perpendicular to the tool axis A$_T$, as shown in FIG. 11a, the peripheral side surface 26 may be in contact with the first support surface 72.

In some embodiments of the present invention, the third plane P3 may intersect the circumferential wall 64.

Also in some embodiments of the present invention, the third plane P3 may intersect the seat surface 70.

Further in some embodiments of the present invention, the third plane P3 may intersect the first threaded bore 74a.

As shown in FIG. 11a, one of the first and second opposing primary side surfaces 32a, 32b may be in contact with the first support surface 72.

In some embodiments of the present invention, the first and second opposing primary side surfaces 32a, 32b may include planar first and second primary side walls 82a, 82b.

As shown in FIG. 11a, one of the first and second primary side walls 82a, 82b may be in contact with the first support surface 72.

In some embodiments of the present invention, the first and second primary side walls 82a, 82b may be ground.

It should be appreciated that the first and second primary side walls 82a, 82b may be ground whilst the cutting insert 20 is mounted in the single grinding jig (not shown), thus improving manufacturing efficiency.

Also in the absence of a radially outward force F$_R$ on the cutting insert 20, the knob 76 may not be in contact with the cutting insert 20.

It should be appreciated that in the absence of a radially outward force F$_R$ on the cutting insert 20, as shown in FIG. 11a, there may be a gap G between one of the first and second abutment walls 46a, 46b and the stopper surface 80.

It should also be appreciated that the gap G may be very accurate, by virtue of the first and second abutment walls 46a, 46b and the first and second primary side walls 82a, 82b being ground, the gap G having a range of between 0.05 to 0.20 mm.

It should be further appreciated that FIG. 11a shows the gap G to an exaggerated scale to facilitate understanding of the invention.

Further, in the absence of a radially outward force F$_R$ on the cutting insert 20, the longitudinal first plane P1 may be substantially parallel to the support axis A$_S$.

Figure 11B:
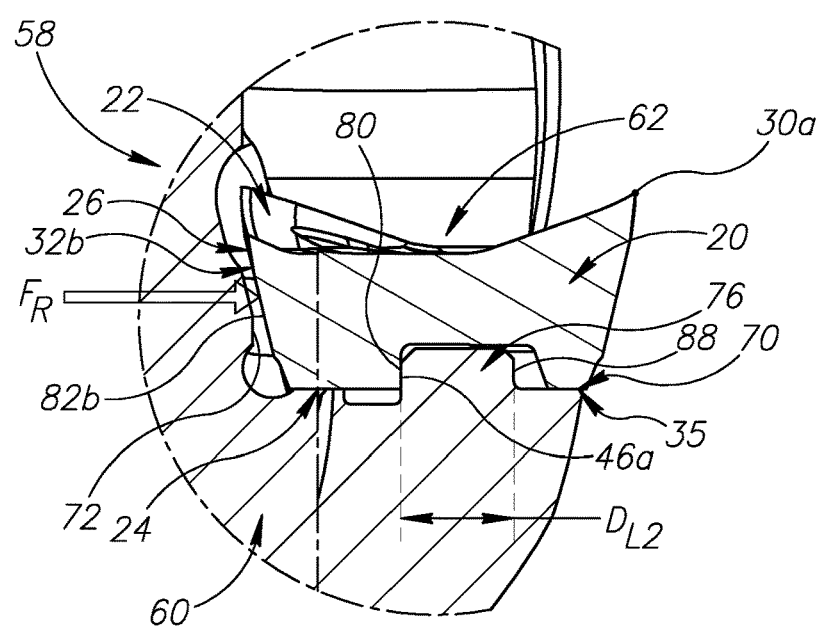
FIG. 11b is a cross-sectional view of the cutting tool shown in FIG. 9, taken along the line XI-XI, in the presence of a sufficiently large radially outward force on the cutting insert.

In the presence of a sufficiently large radially outward force F$_R$ on the cutting insert 20, for example, during high speed milling operations at greater than 30,000 revolutions per minute, the cutting insert 20 may undergo repositioning until one of the first and second abutment walls 46a, 46b makes contact with the stopper surface 80, and the cutting insert 20 is radially supported by the knob 76, as shown in FIG. 11b.

It should thus be appreciated that in the presence of a sufficiently large radially outward force F$_R$ on the cutting insert 20, as shown in FIG. 11b, there may be no gap between one of the first and second abutment walls 46a, 46b and the stopper surface 80.

It should also be appreciated that for embodiments of the present invention in which the first and second channel depths D$_{C1}$, D$_{C2}$ are at least one-fifth of the first and second minimum bore diameters DB$_{MIN1}$, DB$_{MIN2}$, respectively, robust contact can be provided between one of the first and second abutment walls 46a, 46b and the stopper surface 80.

Also in the presence of a sufficiently large radially outward force F$_R$ on the cutting insert 20, in the cross-section taken in the third plane P3, as shown in FIG. 11b, the peripheral side surface 26 may not be in contact with the first support surface 72.

Further in the presence of a sufficiently large radially outward force F$_R$ on the cutting insert 20, and in a cross-section taken in any plane perpendicular to the tool axis A$_T$, the peripheral side surface 26 may not be in contact with the first support surface 72.

As shown in FIGS. 7 to 10, the insert receiving pocket 62 may have a second support surface 84 transverse to the seat surface 70, and one of the first and second opposing secondary side surfaces 34a, 34b may be in contact with the second support surface 84.

In some embodiments of the present invention, the second support surface 84 may be spaced apart from the first support surface 72, and as shown in FIG. 10, the first and second support surfaces 72, 84 may form an acute external pocket angle α1.

It should be appreciated that the second support surface 84 may provide radial support to the cutting insert 20 in the presence of a sufficiently large radially outward force F$_R$, by virtue of the external pocket angle α1 being acute.

In some embodiments of the present invention, the pocket angle α1 may have a value of less than or equal to 60 degrees.

Also in some embodiments of the present invention, the first and second opposing secondary side surfaces 34a, 34b may include planar first and second secondary side walls 86a, 86b, and one of the first and second secondary side walls 86a, 86b may be in contact with the second support surface 84.

Further in some embodiments of the present invention, the first and second secondary side walls 86a, 86b may be ground.

It should be appreciated that the first and second secondary side walls 86a, 86b may be ground whilst the cutting insert 20 is mounted in the single grinding jig (not shown), thus improving manufacturing efficiency.

As shown in in FIGS. 10, 11a and 11b, the knob 76 may have a radially outwardly facing non-stopper surface 88 facing away from the stopper surface 80, and the stopper and non-stopper surfaces 80, 88 may be spaced apart by a second lateral distance $D_L2$.

In some embodiments of the present invention, the second lateral distance $D_L2$ may be greater than twice the first lateral distance $D_L1$.

It should be appreciated that for embodiments of the present invention in which the second lateral distance $D_L2$ is greater than twice the first lateral distance $D_L1$, the first and second cavities 52a, 52b provide the additional space to accommodate the robust knob 76.

Figure 12:
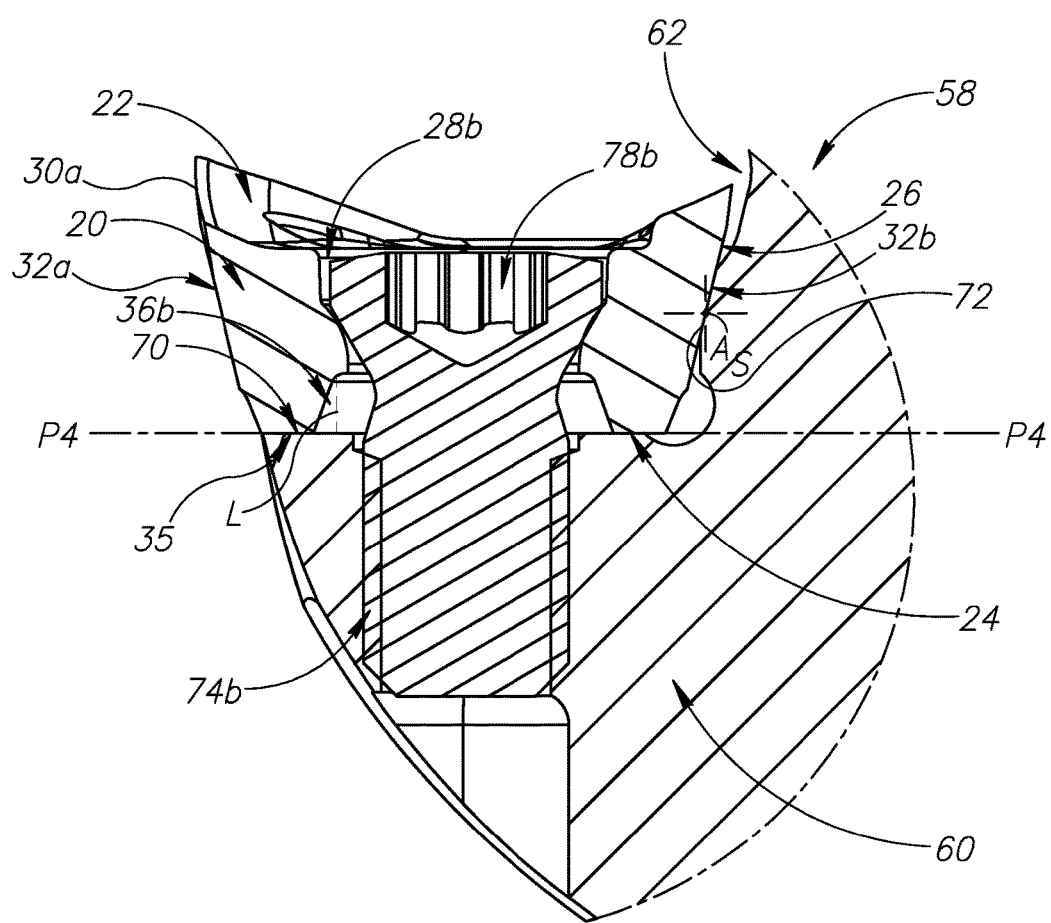
FIG. 12 is a cross-sectional view of the cutting tool shown in FIG. 9, taken along the line XII-XII.

As shown in FIG. 12, the seat surface 70 may define a fourth plane P4.

In some embodiments of the present invention, an imaginary straight line L perpendicular to the fourth plane P4 may extend between any point on the first and second annular recesses 36a, 36b and the fourth plane P4 without intersecting another portion of the insert receiving pocket 62.

Although the present invention has been described to a certain degree of particularity, it should be understood that various alterations and modifications could be made without departing from the spirit or scope of the invention as hereinafter claimed.

What is claimed is:

1. An indexable, single-sided cutting insert (20) comprising:
   opposing upper and lower surfaces (22, 24) with a peripheral side surface (26) extending therebetween and a central axis ($A_C$) passing therethrough, the upper and lower surfaces (22, 24) having shapes that differ from one another;
   first and second clamping bores (28a, 28b) extending between and opening out at the upper and lower surfaces (22, 24), the first and second clamping bores (28a, 28b) having first and second bore axes ($A_B1$, $A_B2$), respectively; and
   first and second primary cutting edges (30a, 30b) formed at the intersection of the upper surface (22) and the peripheral side surface (26);
   wherein the lower surface (24) includes:
      a planar base surface (35),
      first and second annular recesses (36a, 36b) communicating with the first and second clamping bores (28a, 28b), respectively, and
      first and second recess channels (44a, 44b) extending from the first and second clamping bores (28a, 28b), respectively, to the peripheral side surface (26), the first and second recess channels (44a, 44b) extending parallel to a longitudinal first plane (P1) containing the central axis ($A_C$).

2. The cutting insert (20) according to claim 1, wherein the base surface (35) includes no more than two laterally spaced apart coplanar base sub-surfaces (35', 35").

3. The cutting insert (20) according to claim 1, wherein the first and second bore axes ($A_B1$, $A_B2$) are contained in the longitudinal first plane (P1).

4. The cutting insert (20) according to claim 3, wherein:
   the first and second bore axes ($A_B1$, $A_B2$) are parallel and spaced apart by a bore distance ($D_S$),
   the first and second primary cutting edges (30a, 30b) have first and second primary lengths ($L_P1$, $L_P2$), respectively, measured parallel to the longitudinal first plane (P1), and
   each of the first and second primary lengths ($L_P1$, $L_P2$) is greater than twice the bore distance ($D_S$).

5. The cutting insert (20) according to claim 1, wherein:
   the first and second recess channels (44a, 44b) include first and second abutment walls (46a, 46b), respectively, transverse to the base surface (35),
   a portion of a first abutment axis ($A_A1$) parallel to the longitudinal first plane (P1) is contained in the first abutment wall (46a), and
   a portion of a second abutment axis ($A_A2$) parallel to the longitudinal first plane (P1) is contained in the second abutment wall (46b).

6. The cutting insert (20) according to claim 5, wherein the first and second abutment walls (46a, 46b) are perpendicular to the base surface (35).

7. The cutting insert (20) according to claim 5, wherein the first and second abutment walls (46a, 46b) are ground and planar.

8. The cutting insert (20) according to claim 5, wherein the first and second abutment walls (46a, 46b) are located on opposite sides of the longitudinal first plane (P1).

9. The cutting insert (20) according to claim 5, wherein the first and second abutment walls (46a, 46b) are longitudinally spaced apart from one another, and located on opposite sides of a lateral second plane (P2) containing the central axis ($A_C$) and perpendicular to the longitudinal first plane (P1).

10. The cutting insert (20) according to claim 5, wherein:
    the first and second recess channels (44a, 44b) include first and second non-abutment abutment walls (48a, 48b) facing towards the first and second abutment walls (46a, 46b), respectively,
    a portion of the first abutment axis ($A_A1$) is contained in the second non-abutment wall (48b), and
    a portion of the second abutment axis ($A_A2$) is contained in the first non-abutment wall (48a).

11. The cutting insert (20) according to claim 1, wherein the lower surface (24) includes a third recess channel (44c) extending from the first clamping bore (28a) to the second clamping bore (28b).

12. The cutting insert (20) according to claim 1, wherein the first and second annular recesses (36a, 36b) intersect first and second bore neck-portions (40a, 40b) of the first and second clamping bores (28a, 28b) at first and second minimum bore diameters ($D_{BMIN}1$, $D_{BMIN}2$), respectively.

13. The cutting insert (20) according to claim 12, wherein:
    the first and second annular recesses (36a, 36b) include first and second annular shoulder surfaces (38a, 38b), respectively, the first and second annular shoulder surfaces (38a, 38b) intersect the first and second bore neck-portions (40a, 40b), respectively, and the first and second annular shoulder surfaces (38a, 38b) are coplanar and perpendicular to the central axis (Ac).

14. The cutting insert (20) according to claim 12, wherein:
the first and second recess channels (44a, 44b) have first and second channel depths (Dc1, Dc2), respectively, measured parallel to the central axis (Ac), and the first channel depth (Dc1) is at least one-fifth of the first minimum bore diameter (DBMIN1), and the second channel depth (Dc2) is at least one-fifth of the second minimum bore diameter (DBMIN2).

15. The cutting insert (20) according to claim 12, wherein:
the first and second annular recesses (36a, 36b) include first and second conical recess surfaces (42a, 42b), respectively, the first and second conical recess surfaces (42a, 42b) intersect the base surface (35) at first and second maximum recess diameters (DRMAX1, DRMAX2), respectively, and the first maximum recess diameter (DRMAX1) is at least six-fifths of the first minimum bore diameter (DBMIN1), and the second maximum recess diameter (DRMAX2) is at least six-fifths of the second minimum bore diameter (DBMIN2).

16. The cutting insert (20) according to claim 10, wherein:
the first recess channel (44a) forms part of a first cavity (52a) in the lower surface (24) and the second recess channel (44b) forms part of a second cavity (52b); and the first cavity (52a) has a first cavity wall (54a) facing towards the first abutment wall (46a), and the second cavity (52b) has a second cavity wall (54b) facing towards the second abutment wall (46b).

17. The cutting insert (20) according to claim 16, wherein the first cavity (52a) adjoins the first annular recess (36a), and the second cavity (52b) adjoins the second annular recess (36b).

18. The cutting insert (20) according to claim 16, wherein:
the first recess channel (44a) has a first channel width (Wc1) from the first abutment wall (46a) to the first non-abutment wall (48a), and the first cavity (52a) has a first cavity width (Wo1) from the first abutment wall (46a) to the first cavity wall (54a), the second recess channel (44b) has a second channel width (Wc2) from the second abutment wall (46b) to the second non-abutment wall (48b), and the second cavity (52b) has a second cavity width (Wo2) from the second abutment wall (46b) to the second cavity wall (54b), the first cavity width (Wo1) is more than 50% greater than the first channel width (Wc1), and and the second cavity width (Wo2) is more than 50% greater than the second channel width (Wc2).

19. A cutting tool (58) rotatable about a tool axis (AT), comprising:
a cutting body (60); and
at least one indexable cutting insert (20) in accordance with claim 1 removably secured in an insert receiving pocket (62) of the cutting body (60),
wherein:
the insert receiving pocket (62) comprises a planar seat surface (70), a first support surface (72) transverse to the seat surface (70), first and second threaded bores (74a, 74b) in the seat surface (70), and a knob (76) protruding from the seat surface (70), the knob (76) having a stopper surface (80); and the first and second recess channels (44a, 44b) include first and second abutment walls (46a, 46b), respectively, transverse to the base surface (35), wherein the base surface (35) is in contact with the seat surface (70), and first and second clamping screws (78a, 78b) extend through the first and second clamping bores (28a, 28b) and threadingly engage the first and second threaded bores (74a, 74b), and wherein:
in the absence of a radially outward force (FR) on the cutting insert (20), the knob (76) is not in contact with the cutting insert (20), and in a cross-section taken in a third plane (P3) perpendicular to the tool axis (AT), the peripheral side surface (26) is in contact with the first support surface (72); and in the presence of a sufficiently large radially outward force (FR) on the cutting insert (20), one of the first and second abutment walls (46a, 46b) is in contact with the knob's stopper surface (80), and in the cross-section taken in the third plane (P3), the peripheral side surface (26) is not in contact with the first support surface (72).

20. The cutting tool (58) according to claim 19, wherein in the presence of a sufficiently large radially outward force (FR) on the cutting insert (20), and in a cross-section taken in any plane perpendicular to the tool axis (AT), the peripheral side surface (26) is not in contact with the first support surface (72).

21. The cutting tool (58) according to claim 19, wherein:
the first support surface (72) faces radially outwardly, and the stopper surface (80) faces radially inwardly.

22. The cutting tool (58) according to claim 19, wherein:
the cutting body (60) is cylindrical shaped, having a circumferential wall (64) extending between forward and rear end surfaces (66, 68) facing in opposing forward and rearward directions (FD, RD), respectively, the insert receiving pocket (62) is formed in the circumferential wall (64) adjacent the forward end surface (66), and the first threaded bore (74a) is located between the second threaded bore (74b) and the knob (76), and forward of the second threaded bore (74b).

23. The cutting tool (58) according to claim 19, wherein:
the insert receiving pocket (62) comprises a second support surface (84) transverse to the seat surface (70), the insert's peripheral side surface (26) comprises first and second opposing secondary side surfaces (34a, 34b), the first and second opposing secondary side surfaces (34a, 34b) intersect the longitudinal first plane (P1), and one of the first and second opposing secondary side surfaces (34a, 34b) is in contact with the second support surface (84).

24. The cutting tool (58) according to claim 23, wherein:
the second support surface (84) is spaced apart from the first support surface (72), the first and second support surfaces (72, 84) form an acute external pocket angle ($\alpha 1$), and the pocket angle ($\alpha 1$) has a value of less than or equal to 60 degrees.

* * * * *